United States Patent [19]

Hall et al.

[11] 4,123,392

[45] Oct. 31, 1978

[54] NON-COMBUSTIBLE NUCLEAR RADIATION SHIELDS WITH HIGH HYDROGEN CONTENT

[75] Inventors: William C. Hall, Central Valley; John M. Peterson, Rock Tavern, both of N.Y.

[73] Assignee: Chemtree Corporation, Central Valley, N.Y.

[21] Appl. No.: 695,378

[22] Filed: Jun. 14, 1976

Related U.S. Application Data

[63] Continuation-in-part of Ser. No. 243,825, Apr. 13, 1972, abandoned.

[51] Int. Cl.[2] .......... C09K 3/00

[52] U.S. Cl. .......... 252/478; 106/90; 250/515

[58] Field of Search .......... 106/90, 97; 252/478

[56] References Cited

U.S. PATENT DOCUMENTS

| | | | |
|---|---|---|---|
| 3,021,291 | 2/1962 | Thiessen | 260/2.5 |
| 3,207,705 | 9/1965 | Hall | 252/478 |
| 3,423,375 | 1/1969 | Strand | 252/478 X |
| 3,644,736 | 2/1972 | Kato et al. | 252/478 X |
| 3,663,251 | 5/1972 | Moren et al. | 106/90 |

*Primary Examiner*—Leland A. Sebastian
*Attorney, Agent, or Firm*—Posnack, Roberts, Cohen & Spiecens

[57] ABSTRACT

This invention relates to compositions, methods of production and uses of non-combustible nuclear radiation shields, with particular emphasis on those containing a high concentration of hydrogen atoms, especially effective for moderating neutron energy by elastic scatter, dispersed as a discontinuous phase in a continuous phase of a fire resistant matrix.

22 Claims, No Drawings

NON-COMBUSTIBLE NUCLEAR RADIATION SHIELDS WITH HIGH HYDROGEN CONTENT

PRIOR APPLICATIONS

This is a continuation-in-part of our earlier U.S. Patent application Ser. No. 243,825 filed Apr. 13, 1972 which is now abandoned.

BACKGROUND OF THE INVENTION

Problems of nuclear radiation shielding for both personnel and certain instruments arise in a wide variety of activities such as power reactors, industrial processing and non-destructive testing. The problem also is found in such fields as medicine, space technology, oceanography and in fundamental studies involving basic experimental research.

Shielding materials are required to meet increasingly more diverse performance criteria as the applications of nuclear radiation expand to new areas and make significant improvements in old areas. These applications, as a group, include all types of radiations but, individually, each has its own special shielding requirement.

A large number of radiation shielding problems involve neutrons and, in this area especially, the hydrogen atom as a component of the shield has a particular value, because the hydrogen atom is the most effective of all atoms in moderating neutrons by elastic scatter. This process occurs without the production of gamma photons, which are produced by neutron energy lost by inelastic scatter when a neutron strikes a massive atom with a high atomic number. For this reason, hydrogenous materials, especially those with a high hydrogen atom concentration have been widely employed to attenuate neutrons from many sources, especially those produced in nuclear reactors, particle accelerators, and certain radioisotopic materials.

With only a few exceptions, materials containing a high concentration of hydrogen atoms are combustible in air. Non-combustible hydrogenous materials generally contain a much lower concentration of hydrogen atoms, and consequently do not provide the desired efficiency of neutron attenuation. Water is the obvious exception, but this substance has the great disadvantage of not being self-supporting under usual operating conditions of temperature and pressure, and complications arise from container problems when containers are used.

PRIOR ART

In the prior art, nuclear shields with high hydrogen content have consisted of blocks of paraffin, polyethylene and other synthetic organic plastics, natural and pressed wood, bonded cellulosic products, epoxy cement mixtures and other combustible carbonaceous materials. All of these substances are highly flamable to varying degrees, and their use presents a recognized fire and radiation hazard, which heretofore unfortunately has been accepted reluctantly by the nuclear industry in many situations. En masse, these materials form a continuous phase that supports combustion and adds fuel to a fire generated either internally or externally to the shield itself that, in turn, causes the fire to spread and intensify.

Another definite disadvantage of this type of shield is that it has no supplementary supporting structure in the form of a non-combustible continuous phase. The entire structure of these shields is lost as soon as the temperature reaches the softening or decomposition point of the combustible, hydrogenous material, which intensifies seriously the radiation hazard.

Some of these organic materials with high hydrogen content have been fortified with other elements useful for special radiation problems involving a mixed flux but, even in these admixtures, the carbonaceous ingredient remains as the continuous phase that cements the total mass together. It is this continuous phase of combustible material that characterizes the entire shield as combustible and renders the composite material unsafe for use as a shield.

A detailed search of the literature has failed to disclose a satisfactory solution for the fire and radiation hazards associated with the use of suitable hydrogenous materials for nuclear radiation shields. Many references are made to compositions useful for certain purposes in various industries, such as the building industry. Here, various materials have been added to cements to achieve many desired characteristics such as low density, improved workability of mortar, low cost and better acoustical properties, but the descriptions are vague as well as incidental and peripheral to the problems involved in the high hydrogen-fire risk problem. No disclosures have been focused directly on the combustible characteristics of nuclear radiation shielding material containing the desired high concentration of hydrogen atoms, or on the parameters related to minimizing the fire risks involved in their use. The literature is completely void concerning compositions and methods for optimization of the desired properties involving combustible hydrogenous materials.

U.S. Pat. No. 3,207,705 (Hall) discloses radiation shielding compositions consisting of an inorganic matrix to which is added other components such as comminuted lead, charcoal and asbestos. No reference is made to organic compounds containing hydrogen atoms, nor to any combustible compound containing hydrogen atoms. Hall made no reference whatsoever to any objective related to a non-combustible shield or to one containing a high concentration of hydrogen atoms.

U.S. Pat. No. 3,021,291 (Thiessen) produces a lightweight, cellular-concrete block resistant to water penetration for the construction industry. This patent discloses the addition of expandible polymeric materials, which expand during a subsequent heat treatment, into the concrete mixture for the purpose of reducing porosity and hence moisture absorption. No reference is made to its nuclear radiation characteristics nor to its fire resistant characteristic. The Thiessen composition is one having the homogenous material in a continuous phase and not in a discontinuous phase. Justification for this relevant conclusion is included later in the specification.

Combustible shielding materials have been involved in several fires, and prove beyond doubt that the hazards associated with the use of combustible shields is a realistic possibility. The widely publicized fire at the Senna Power Reactor on the Belgium-France border (1967), the 45 million dollar fire at the Rocky Flats, Colorado plutonium processing facility operated for the Atomic Energy Commission by Dow Chemical Co. (1969), and at the Browns Ferry Reactor plant (1975) are among the more dramatic examples supporting the conclusion that new solutions to the shielding problems must be found and implemented. All these above-mentioned fires involved combustible, organic material present in continuous phase.

In all cases, the fire risk problems were recognized and the most sophisticated nuclear radiation shield design known in the art was used, yet in spite of all this knowledge serious fires did occur. The inevitable conclusion reached from these facts is that improvements disclosed in the instant application were heretofore unknown to those skilled in the art, and that the prior art does not anticipate the results disclosed in the present application.

SUMMARY OF INVENTION

It is an object of the invention to provide improved radiation shielding.

It is another object of the invention to provide improved techniques rendering nuclear shielding substantially free from the hazards of fire.

Another object is to improve shielding techniques to provide for casting at site.

A safe, non-combustible radiation shield with high hydrogen content is provided in accordance with the present invention. This achievement results from a new concept wherein hydrogen atoms in a suitable form are introduced as the discontinuous phase into a non-combustible cement that forms the continuous phase of the finished shielding product. Thus, even though the hydrogeneous material may be combustible en masse, the present invention provides that the hydrogeneous material is dispersed in relatively small particles, each of which is surrounded by a non-combustible material. These fire barriers between the individual combustible particles prevent propagation of fire throughout the entire mass. These barriers also tend to prevent oxygen from reaching the discontinuous phase, as would be necessary to support combustion.

This invention also has a great advantage of convenience of application compared with shielding materials produced with plastic binders. In one or more of its more useful forms, the product is commercially available as a dry powder that requires only the addition of water to produce, without heat or pressure, a formable mortar that can be poured or cast to any desired shape at the construction site. It also can be troweled, plastered, or sprayed by techniques familiar to construction workers. The set material also may be drilled, tapped or shaped, if desired. Furthermore, use of this material eliminates the machining to close tolerances of precast material and the use of staggered joints to prevent radiation streaming, which are often troublesome problems encountered in the prior shielding art.

An additional advantage is the considerable flexibility in formulation of the shielding product to meet specific shielding requirements, without the use of expensive milling or mixing processing. Still another advantage of this invention is that the continuous phase cement with inorganic bonding usually has a higher thermal stability than does the carbonaceous continuous phase of the conventional high hydrogen content shield. Should a dangerously high temperature be reached inadvertently, the continuous phase hydrogeneous shield based on the prior art will soften, melt or be decomposed with the complete loss of structure, whereas the higher thermal resistance of the inorganic bonds of the continuous phase into which the hydrogeneous phase is dispersed as used in this invention will retain the structure and form of the shield, to provide continued radiation protection.

DETAILED DESCRIPTION

As noted above, the invention involves a certain type of discontinuous phase dispersed in a continuous phase matrix. These phases are discussed below.

Continuous Phase Cement

Any non-combustible natural or synthetic cement can be used. For example, these include the standard cements widely used in the building industry: Portland cement of various types, wall plaster, plaster of Paris, silica gel and clay. These cements may be modified to meet special requirements and may be classified to reflect their chemical composition, as for example: lime mortars, calcined lime, calcium alumina silicates, magnesium oxychloride, phospate cements, all of which may be modified by the addition of various fillers such as calcium, magnesium, aluminum and silicon compounds to obtain properties such as desired setting time, strength, resistance to corrosion and high temperature environments. For example, asbestos fibers can be used to improve strength, reduce density and impart desired acoustical properties.

Cements that set by chemical reaction with water such as Portland cement and wall plaster have the added advantage of containing hydrogen atoms in the bonding matrix itself. These cements are also inexpensive, readily available, produce structures of good strength and have a technology of application that is convenient and well established.

In addition to those better known cements may be added lead powder, which sets by the addition of controlled quantities of water, as next described. Water is thoroughly mixed with finely divided lead powder in sufficient quantity to form a stiff, easily workable mortar, which may be applied by any one of the many standard mortar techniques. After expressing any excess water that may be present in the mortar, the entire mass sets to a self supporting structure in the course of time without the application of pressure or heat. If the mortar is cast in a mold of predetermined shape and size, use of perforated molds assists in the removal of excess water. Vibrating or rodding of the mortar in the mold also is beneficial in bleeding excess water for its removal, to produce a dense set mass with a density of about 7.0 g $cm^{-3}$. Addition of new dry lead powder to the excess water rising during vibration to the top of the partially filled mold is a convenient technique for handling this excess water. A good uniform bond throughout the entire mass is produced, provided the additional dry lead powder is thoroughly mixed with the excess water, and the resulting mortar well rodded into the lower layer. This cement is the object of U.S. Pat. No. 3,827,982.

The use of the lead powder-water mortar in this invention has a particular advantage when used in connection with a mixed flux consisting of both neutrons and photons. The lead with its high density is especially effective for photon (gamma or X-ray) attenuation, and also contributes to a lesser degree through the hydrogen atoms, from its retained water in the set mortar, to the moderation of neutrons by elastic scatter. It also has special value when used with modified materials that induce gamma radiation within the shield itself.

Hydrogenous Discontinuous Phase

Many different types of hydrogenous materials can be used in the discontinuous phase and these include both inorganic and organic solid materials.

Metal hydrides, hydroxides, inorganic ammonium salts and hydrates are examples of the inorganic substances. Some of the metal hydrides are especially useful because of a combination of both high hydrogen content and good thermal stability such as is found, for example, in titanium hydride.

The suitable organic materials are more numerous, and examples include hydrocarbons (aliphatic and aromatic), hydrocarbon plastics (such as polyethylene, polypropylene and polystyrene), natural and synthetic rubber, other plastics or resins containing atoms in addition to carbon and hydrogen (such as acrylic, amino, phenolic, polyamide, polyester, polyurathanes and vinyl resins), carbohydrates (such as sucrose), organic ammonium salts, and a large variety of other classes of organic compounds and their derivatives. Actually there is very little limitation relative to the type of solid organic material that may be used but, in general, the high molecular weight hydrocarbons are preferred because of their higher hydrogen content. The high carbon content of these hydrocarbons also gives good neutron moderation. Hydrogenous materials particularly suited for this invention are those containing the maximum density of hydrogen atoms. Desirably, they should also possess relative characteristics as follows: high thermal stability, high melting point, good physical structural properties, and its adaptability for division into controlled particle sizes and shapes by various standard techniques such as extrusion, cutting and spraying. The broad class of hydrogenous materials that have these preferred characteristics fall within the general classifications usually known as plastics or resins. In this connection, it is interesting to note that polyethylene contains more hydrogen atoms per unit volume than water, and thus it is a better neutron attenuator than water. Although it is somewhat limited in its operating temperature range, and suffers radiation damage with long exposure under heavy radiation intensities, it can be very useful for applications involving moderate temperatures and radiation intensities.

Although significant differences may be expected within the general class of hydrocarbons, appreciable differences are noted within limited classification such as the group of polyethylene. For example, "linear" or "high density" polyethylene has several advantages over conventional "low density" types for use in neutron shielding, including greater stiffness and structural strength, wider temperature range stability, and a greater number of hydrogen atoms per unit volume. The relatively low cost of polyethylene often is an important asset.

Plastics generally are more sensitive to radiation effects than most inorganic materials. Like most other organic substances, plastics consist primarily of atoms of carbon and nydrogen bound together by electron-exchange forces, or chemical bonds. These bonds, often called covalent bonds, are relatively easy to break, compared with inorganic bonds, when the molecules are subjected to nuclear energy. In some plastics, the noticeable effect of radiation is the breaking of these bonds, which is known as "cessation" of the main polymer chains. The result is a decrease in the average molecular weight, degradation of all physical and electrical properties and increase in solubility in various solvents. In other plastics, the first effect of radiation is the formation of new chemical bonds that produce a cross-linking of the polymer chains. The general result is an increase in molecular weight, hardness and tensile strength and, in the case of a thermoplastic, an increase in the so-called melting point until the material becomes infusible or thermoset. In some polymers, these two effects occur simultaneously, but generally at different rates so that one effect predominates and determines the composite effect. In those materials in which cross-linking occurs first, continued irradiation will eventually result in cessation of the main polymer chains, and final disintegration.

Compared to inorganic materials, a relatively small dose of radiation is required to produce detectable damage in a plastic. This great contrast in radiation stability is one of the outstanding advantages of our invention. When a radiation shield with a plastic in continuous phase fails under a radiation flux, the structure is lost and ceases to be a protective shield, but when the plastic in a discontinuous phase fails, the more stable inorganic bonds of the continuous phase remain intact and support the plastic composition long after the plastic has lost the ability to support itself. While the stability of the plastic is much less crucial when used in the discontinuous phase, in certain applications, the highest stability attainable in this phase is desirable.

Difference in molecular structures render materials unstable, to various degrees, under radiation exposures. Within the broad family of plastics a wide choice of (plastic) materials, which will withstand radiation damage, is readily available. For example, the presence of a benzene ring attached to the side of the main molecular chain, as in the case of polystyrene, greatly increases the ability of the material to absorb energy without damage. Other types of polymeric molecular structure are much more vulnerable to the effects of absorbed energy and are more easily broken at their bonds. Although there is significant variation from one polymer to another, radiation damage for any one material apparently is largely proportional to the total absorbed energy. A relationship useful for quick, approximate comparison is that for all organic materials under neutron, gamma and x-ray radiation, the rad or unit of absorbed energy, is equivalent to the rep or unit of radiated energy within a factor of 1.5.

The extent to which plastics are permanently damaged by radiation depends upon several factors such as types of radiation and spectra of their energies, presence or absence of oxygen, thickness of sample, temperature and physical strain of the specimen, and composition of material.

For rough approximate estimates, comparative values are shown in Table I.

TABLE 1

Radiation Doses Required to Produce Significant Damage in Various Plastics

| Plastic | Dose (rads)* |
|---|---|
| Polystrene | $4 \times 10^9$ |
| Silicons | $2 \times 10^9$** |
| Epoxies | $1 \times 10^9$ |
| Melamine | $1 \times 10^8$ |
| CR 39 | $9 \times 10^7$ |
| Polyethylene | $9 \times 10^7$ |
| Poly carbonate | $8 \times 10^7$ |
| Urea | $5 \times 10^7$ |
| Polyester film | $3 \times 10^7$ |
| Cellulosics | $2 \times 10^7$ |
| Kel F | $2 \times 10^7$ |
| Unsaturated Polyesters | $9 \times 10^5$ |
| Acrylic mechanical | $1 \times 10^7$ |
| optical | $5 \times 10^6$ |
| Nylon | $5 \times 10^6$ |

TABLE 1-continued

| Radiation Doses Required to Produce Significant Damage in Various Plastics | |
|---|---|
| Plastic | Dose (rads)* |
| Teflon | $4 \times 10^4$ |

*A unit of energy actually absorbed, regardless of type or energy level of radiation, equivalent to the absorption of 100 ergs per gram of material.
**Fiber glass laminated.

Table I shows a preference with respect to radiation stability, but many other parameters must be considered to optimize the selection of a particular plastic for a specific application. Polypropylene and polybutylene, for example, have higher temperature limits than polyethylene, and neoprene exhibits still higher thermal stability. A very wide choice therefore is possible from the broad class of organic compounds containing hydrogen in selecting a material for the discontinuous phase suitable for achieving a desired result.

For gamma radiation alone, urethane rubber and natural rubber show nearly the same resistance as polystyrene.

Additional Additives

Compositions previously described may be further modified by the addition of various other substances to the mortar mix. Some of these additives may contain hydrogen atoms in combination with other elements that produce specific beneficial attentuation effects, such as certain ammonium salts, hydrates and especially metal hydrates. Other additives contain no hydrogen atoms and may be added to meet specific shielding requirements as will be described later.

Most elements form hydrides. Because of the variety of elements that combine with hydrogen, the hydrides are characterized by a wide variety of properties and thus are representatives of several types of bonding. Often hydrides are classfied as follows:

1. Saline, (or salt like) characterized by ionic lattices.
2. Covalent or molecular, characterized by molecular lattices made up of individual saturated covalent molecules and usually volatile.
3. Metallic, characterized by metallic structures and resembling an alloy in most of their characteristics. They are in effect interstitial materials and often lack the stoichiometry associated with true electronic bonding. They are hard, brittle, lustrous, conduct electricity and they generally are not reactive toward water unless the metals themselves are.

The lines of demarcation between these groupings are not always sharp.

Only the metallic hydrides have application in the present invention. Specifically included in this grouping are the hydrides of elements located in the periodic table as follows:

Column II *a:* Beryllium and Magnesium

Columns III *a:* Scandium

Columns IV*a*, V*a*, VI*a*, VII*a*, VIII, I*b* and II*b* — (all members)

Column III*b:* Thallium

All Lanthanides (elements with atomic numbers 58–71 inclusive)

Elements with atomic numbers of 90 and higher, including the transuranic elements.

Of these metallic hydrides, some are unstable and others react with water, and consequently they are not useful in this invention. For example, hydrides of beryllium and magnesium are not sufficiently stable for use. Examples of metal hydrides which are stable and which do not readily react with water include hydrides of titanium, zirconium, hafnium, tantalum and plutonium.

For purposes of this invention, titanium hydride has special value because of its relatively high hydrogen content of 4.04 percent by weight, and because of its commercial availability. Gadolinium hydride supplies desirable hydrogen atoms and also furnishes gadolinium atoms with a very high capture section for thermal neutrons (46,000 barns). The relatively very high density of plutonium atoms in plutonium hydride is particularly effective in photon attenuation, exclusive of the middle energy range 1–2 MeV.

Many other kinds of additives may be used to meet the requirements for particular radiation types and spectrums involved. The action of each individual atom is specific, and there even may be marked differences between different isotopes of the same chemical element. The problem becomes more complex when the radiation source consists of a flux of mixed radiation types of various energy levels. The situation may be further complicated when secondary radiation effects are induced within the shield, as a result of interaction of the initial flux with certain atoms in the shield itself. For example, radiations from a nuclear reactor involving fissioning of uranium initially includes only fast neutrons, gamma rays and fission fragments. Except for gamma rays, which are attenuated by adequate mass of matter, a long series of interactions involving several simultaneous side reactions must occur before total attenuation is complete. Each situation requires special study for the most satisfactory solution for the problem.

The effectiveness of atoms in arresting thermal neutrons is measured by their comparative neutron cross section, usually measured in barns. Table 2 shows the comparative values for a number of typical elements, and shows the great differences between them.

TABLE 2

Thermal Neutrons Cross Sections of Typical Elements

| Element (In natural abundance) | Atomic Number | Absorptive Cross Section (barns) |
|---|---|---|
| Hydrogen | 1 | 332 ± 2 |
| Lithium | 3 | 71 ± 1.0 |
| Beryllium | 4 | 0.01 ± 0.001 |
| Boron | 5 | 750 ± 10 |
| Carbon | 6 | 0.0032 ± 0.0002 |
| Aluminum | 13 | 0.32 ± 0.005 |
| Titanium | 22 | 5.6 ± 0.4 |
| Iron | 26 | 2.53 ± 0.6 |
| Copper | 29 | 3.69 ± 0.12 |
| Zirconium | 40 | 185 ± 4 |
| Silver | 47 | 63 ± 1 |
| Cadmium | 48 | 2500 ± 100 |
| Tin | 50 | 625 ± 15 |
| Samarium | 62 | 5600 ± 200 |
| Europium | 63 | 4300 ± 100 |
| Gadolinium | 64 | 46000 ± 2000 |
| Dysprosium | 66 | 950 ± 50 |
| Erbium | 68 | 173 ± 17 |
| Thulium | 69 | 115 ± 15 |
| Hafnium | 72 | 127 ± 4 |
| Tungsten | 74 | 19.2 ± 1.0 |

The very high cross section for gadolinium is specially noteworthy as are three other members of the lanthanides: europium, dysprosium and samarium. Cadminum, tin and boron are also relatively high, and lithium is sufficiently high for practical use, especially when the half MeV gamma from neutron capture in boron need be avoided. On the other hand, carbon is a good moderator for high energy neutrons for reducing their energies to a thermal state where they are more easily captured, but it is very poor for neutron capture as shown in Table 2. Selection of a suitable material involves a consideration of these secondary radiation effects in addition to cross section values.

More effective nuclear radiation shields result from the use of enriched isotopes of many of the elements. The isotope of lithium effective for capture of thermal neutrons is lithium 6, which has a reaction cross section of 945 barns. Lithium 7 is nearly worthless for this purpose. Lithium 6 has a natural abundance of only 7.52 percent, and hence the mixture of the two lithium isotopes in natural abundances averages only 71 barns. Similarly, natural boron consists of 19.8 percent boron 10 with a cross section of 3850, and 80.2 percent boron 11 with nearly zero cross section. Boron in natural abundance has a composite cross section of approximately 750 barns. Samarium 14 with a value of approximately 40,800, and present in 15.8 percent contributes significantly to the 5600 barns composite value for samarium in natural abundance. The improvement in shielding characteristics for thermal neutrons is directly proportional to the degree of isotopic enrichment.

The modifying additives usually can be added directly to the mortar mixture to finally become an additional discontinuous phase of the finished shield.

An alternate effective means of adding such an 'additive' to the shield is to disperse it initially in the desired particle size, into a thermal plastic to be used as the hydrogenous ingredient. This mixture, consisting of a discontinuous phase of the additive in a continuous phase of the plastic, may then be reduced to the desired particle size by any suitable method, such as grinding or cutting. This resulting mixture, now available in desired particle size, may in turn be dispersed in the matrix. This procedure eliminates, or greatly minimizes, the direct contact of the new modifier with the continuous phase matrix in the final shield, which is particularly beneficial in certain cases where the new additive retards the setting time or reduces the ultimate strength of the matrix.

For example, a boron loaded polyethylene may be prepared by adding boron in a suitable form to polyethylene in a mixing operation using standard roll milling or kneading equipment. Boron carbide, because of its high boron content, may be used to produce a boron content of thirty or more percent by weight of boron in the finished product. Epoxy-boron carbide products containing 45 or more percent by weight boron may be achieved. These products are particularly effective for applications desiring high attenuation of thermal neutrons. Lithium atoms can be added similarly to plastic compositions in the form of, for example, the flouoride, hydroxide or silicate. While lithium atoms are less effective in attenuating thermal neutrons than are boron atoms, substitution of lithium for boron avoids the one half MeV gamma from neutron capture in boron. Atoms of elements in the lanthanide series also can be introduced. For gamma shielding, in the energy range below about 1 MeV and above about a MeV atoms of elements with high atomic numbers, such as lead and tungsten, may be added to the plastics. The wide choice of plastics available, and the multitude of combinations with desired atoms in various concentrations, permit excellent flexibility in producing materials to meet special situations.

Particle Shape, Size and Distribution of the Discontinuous Phase

Among the variables that affect satisfactory physical structure in the set finished structure prepared from the formable mortar is the quantity of the discontinuous phase present. In the first place, it is desirable that the continuous phase fill all voids created by the discontinuous phase. Usually physical strength is improved when this quantity of continuous phase exceeds this minimum and provides a thicker wall separating the dispersed particles. This situation changes from system to system, depending upon the cohesive forces within such phase, and the adhesive forces acting between all phases present. Another important factor relates to the compatibility of all phases in the system, especially in connection with all bonding actions involved in the setting process. This action often is related to interference of crystalline growth of the continuous phase by either physical or chemical mechanisms. Sometimes it may consist of sorption of very fine additive articles in knitting crystalline surfaces, especially if the additive particles are in the colloidal size range. For this reason, it is usually advantageous to use additives with sizes larger by several orders of magnitude than those classified as colloids.

Particle size and shape distribution are very important factors in determining void volume of the discontinuous phase, and hence the limits of volume ratios between phases. Visualization of an idealized, hypothetical case will help clarify the importance of these variables.

Space may be divided into imaginary cubes packed symmetrically in such a manner that together they occupy the entire space under consideration. Packing of equal size spheres, having diameters equal to the edges of the cubes and with centers of the spheres coinciding with the centers of cubes, presents a pattern of one sphere inscribed in each cube. Such a configuration of spheres then would give the theoretical space occupied equal to the ratio of the volume of the sphere to the volume of the circumscribed cube or $nd^3/6$ to $d^3 = n/6$ = 52.4 percent of space occupied or 48 percent voids. In this type of packing, each sphere is in contact with six other spheres, and the void percent in the total mass remains constant and is independent of the diameter of the sphere. Void space in the total mass will be reduced if the sphere arrangement is changed so that one sphere in each group of four rests symmetrically on three others in the form of a tetrahedron. The extension of this unit will result in each sphere touching twelve adjacent spheres, and the void space is reduced to approximated 26 percent. In actual practice, where the spheres are dumped into a container and vibrated, an average void space of approximately 38 percent results, indicating a mixed packing pattern of the two described.

Further reduction of void space is achieved if smaller spheres are added to fill void space produced in the single sized sphere packing and still further reduction may be realized if smaller spheres are added to fill voids remaining in the intermediate sized spheres. Theoretical geometric calculations reveal that for achieving minimum voids, the size ratio of successive sphere sizes must be large. If each sphere size added is assumed to occupy 38 percent of the remaining void space then, for a system containing two mono-sized spheres in proper proportion, the void space is 14.4 percent of the total and for a system with three different mono-sized spheres, the final void space is approximately 5.4 percent. To obtain this maximum packing, using three sphere sizes with large diameter ratios, calculations indicate that the overall mixture contains by volume 62.0, 23.6 and 9.0 percent of large, intermediate and small spheres, respectively, leaving 5.4 percent voids.

It is impossible to attain in practice this dense packing largely because the large size particles become trapped in the spaces between the large particles and are not free to move. The nearest experimental approach to this theoretical value was achieved with a mixture containing by volume 70 percent coarse, 20 percent medium and 10 percent fine, where the diameter ratios of the spheres were 50:8:1. The resulting bulk-volume was 1.202 from which was calculated a void volume of 16.8 percent. Furthermore, in the practice of this invention, desirable additives for the discontinuous phase are not available in the form of mono-sized spheres. They are irregular in shape and comprise a multiple size distribution range. The theoretical calculations, however, are very useful as general guidelines in determining the parameters and limitations involved, and the basis for optimizing desired compositions.

Another method of reducing void space is by addition of liquid solutions containing atoms of materials that contribute, at the same time, desirable shielding properties to the mixture. These solutions move more freely throughout the mass than do solid particles, and may be drawn into very small voids by capillary action. Upon removal of the solvent by evaporation or other means, the solute crystallizes, often with the formation of a felted mass of interlocking crystals that contribute to the strength of physical structure. This procedure sometimes is the most convenient method for introducing certain desired atoms into the finished product.

The addition of dry sucrose to the dry powder mixture illustrates the application of this technique. Water added to the dry powder to produce a formable mortar dissolves sucrose and carries it into existing voids. It adds to the workability of the mortar and often adds strength and higher density to the final self supporting structure. Sucrose adds to the hydrogen content desired to attenuate neutrons by elastic scatter, and also adds carbon atoms to moderate neutrons to lower energy levels.

In the inorganic field, use of boric acid $H_3BO_3$ may be cited as an example, in spite of its limited solubility in water, relative to sucrose. In this case, the hydrogen content of the mixture is increased, and boron atoms are introduced that are effective in the capture of neutrons.

In general, particle size of all ingredients in a satisfactory radiation shield should be relatively small to insure good homogenity, with the absence of holes that permit transmission of undesirable radiation. The particle size limitation should be determined in the context of the total situations. It makes little difference whether a particular atom is added to a composite shield in the form of a massive, monolithic shield or distributed through the mass in a relatively finely divided powder. Of consequence is the total number of atoms of this particular element in the path of undesirable radiation, whether it is compacted together or dispersed, or whether it is in the chemical form of the pure element or whether it is chemically bound as a compound.

Particle shape, size and size distribution are closely related to shield thickness, in a properly formed shield. In a thicker shield, we may use larger particle size and still have satisfactory attenuation. The important factor is that the density of the atoms of the particular element be uniform as projected to an area at right angles to the path of the radiation. For a given weight concentration of additive, the area of the cross section, and the volume vary as the second and third power of the diameter, respectively. Thus, particle size limitations depend upon specific situations.

A summary of test data from a broad practical viewpoint relative to size and amount of discontinuous phase material preferred in the radiation shield indicates that no more than about 10% pass through a 100 mesh screen and that the quantity range falls within about 2 to 60% volume percent.

EXAMPLES

Many examples may be cited to illustrate the multiplicity of compositions and application of this invention. The following specific examples only illustrate the breadth and scope of the parameters involved and are not intended to indicate limitations placed upon the formulation of the shield.

1. A series of tests were made with Portland Cement-polyethylene powder mixtures, with volume ratios of 1 part Portland Cement to 1, 2, 3 and 4 parts, respectively of polyethylene. Water was added to the dry powder mixture in sufficient volume to produce a workable mortar, which was cast in molds. All mortars set at room temperatures to rigid structures after several hours and the set material gradually became harder as the curing time increased. Comparative strengths of the set material decreased as the ratio of Portland Cement to polyethylene powder decreased.

2. One volume of commercial building plaster was thoroughly mixed with 2 volumes of polyethylene powder and water was added to give a workable mortar which could be plastered on a metal lath anchor, or poured in a mold of the desired size and form. The mortar set to form a self supporting structure. Similar structural results were obtained when 5 percent of lithium compounds, carbonate, fluoride, hydroxide and ortho silicate, respectively, were added to give improved thermal neutron capture. Similar concentration of anhydrous lithium borate ($Li_2B_4O_7$) also proved satisfactory structurally. A boron atom is much more effective than a lithium atom in thermal neutron capture. The lithium boarate forms a hydrate ($Li_2B_2O_7,5H_2O$) during the setting process which adds additional hydrogen.

3. A mixture of titanium hydride and Portland Cement was prepared in the ratio of 1 part to 3 parts by volume and water was added to give a workable mortar which could be molded and set to any desired shape. A specimen cured at laboratory temperature showed good physical structure. This sample showed significantly better thermal resistance than did a similar sample in which polyethylene replaced the titanium.

4. A mixture of dry powders consisting by volume of 5 parts Portland Cement, 10 parts natural Colemanite ore powder containing 35 wt % of $B_2O_3$, 2½ parts of charcoal passing a 20 mesh screen, and 1 part granular sucrose were mixed with water to produce a stiff mortar, which was cast in a mold. The mortar set to good structure on standing for 48 hours. Colemanite is a mineral containing varying concentrations of calcium borate ($Ca_2B_6O_{11}.5H_2O$) and thus furnishes boron atoms for effective thermal neutron capture, and also supplies additional hydrogen atoms from its water of hydration. Sucrose further increases the hydrogen content, and the charcoal supplies additional carbon atoms for neutron moderation. Proportions of the components may be varied significantly to meet specific requirements for mixed radiation fluxes.

5. A mixture by volume of 9 parts Colemanite and 1 part sucrose to which water was added, set to a self supporting structure, although somewhat more slowly than the previous mixture cited in example 4.

6. Compositions were prepared to produce leadwater mortars, which set as the bonding matrix, with polyethylene in the discontinuous phase. The lead was used as a powder, screened through a standard 200 mesh sieve. The polyethylene was a high density (0.96 $g.cm^{-3}$), high molecular weight plastic with a melt index of 0.5 (g/10 min.) and a particle size of between 60 and 100 mesh. Three different volume lead/plastic ratios (1:1, 1:2 and 1:3) were tested. Water was added in sufficient quantity to produce a stiff mortar, which was then placed in a mold and allowed to set. Excess water tended to cause a separation of the ingredients and should be avoided. Even with relatively dry mortar mixes, all possible expressed water should be removed to facilitate setting. All three mixes, with the ratios specified, set satisfactorily to self supporting structures in 48 hours. Strength of all structures produced continued to improve gradually for a period of several weeks. Satisfactory results also were obtained using 100 and 300 mesh powdered lead as well as with polyethylene powder varied from 35 to 100 mesh. Structure improved as particle size of lead decreased and particle size of polyethylene increased. Particle size does not appear critical within these size limits and from the observations it is reasonable to expect good results well beyond these limits.

Additives were added to modify the nuclear shielding characteristics of the preceding mixtures containing a 1:2 ratio of lead/polyethylene. Based on the dry powder, additions were made respectively of: (1) 2.4 percent by weight of technical grade boron carbide containing 70% boron, and passing a 60 mesh standard sieve; (2) 4.5 percent by weight of boron nitride; and (3) 5 percent by weight of granular sucrose. All mixtures set to self supporting structures, although more slowly than did the mixtures without the additives.

7. A series of tests were made to compare various plastics as the discontinuous phase using a non-combustible matrix as the continuous phase.

| Compositions of Dry Powder Mixtures (Parts by Volume) | | |
|---|---|---|
| Lead Powder | Portland Cement | Plastic Powder |
| 1 | — | 1- Polypropylene |

-continued

| Compositions of Dry Powder Mixtures (Parts by Volume) | | |
|---|---|---|
| Lead Powder | Portland Cement | Plastic Powder |
| — | 1 | 1- Polystyrene |
| 1 | — | 1- Polybutadiene |
| 1 | — | 1- Polymethylmethacrylate |
| — | 1 | 1- Polyvinylchloride |
| 1 | — | 1- Nylon |
| — | 1 | 1- Neoprene |
| 1 | — | 1- Polyethylene glycol terepthalate |
| 1 | 1 | 1- Crepe rubber |

All mortars set to form self supporting structures.

8. A polyethylene slab containing 5 weight percent boron was pulverized to pass a 60 mesh screen. Two parts by volume of this powder were mixed with one part by volume of lead powder passing a 300 mesh screen and water was added to form a stiff mortar. When placed in a mold and the excess water expressed, the mortar set to form a self supporting structure. Similar results were obtained when the boron content in the polyethylene was increased to 30 weight percent. Satisfactory results also were achieved when powdered epoxyboron carbide loaded plastic, containing 45 weight percent of boron was substituted for the boron-loaded polyethylene plastic used in the previous example. In a second series of tests, with the same metal-loaded plastics with Portland Cement replacing lead powder as the continuous phase in the set product, satisfactory structures were obtained. These structures produced from metal loaded plastics were significantly superior in strength compared with those obtained when equivalent quantities of boron in various forms were added directly to the continuous phase matrix.

9. A series of tests were made to illustrate further the wide variety of combinations possible for introducing additional hydrogen and important elements as additives into the discontinuous phase.

| | Compositions of Dry Powder Mixtures (Parts by Volume) | | | |
|---|---|---|---|---|
| Lead Powder | Portland Cement | Polyethylene Powder | Other Material | |
| — | 20 | 10 | 1-ammonium borate, $(NH_4)_2B_{10}O_{16}.8H_2O$ | (a) |
| 20 | — | 10 | 1-Lithium hydroxide, Li(OH) | (b) |
| 10 | 10 | 10 | 1-boric acid, $H_3BO_3$ | (c) |
| 20 | — | 10 | 1-calcium sulfate, $CaSO_4$ | (d) |
| 20 | 10 | 10 | 1-gadolinium oxide, $Gd_2O_3$ | (e) |
| — | 20 | 10 | 1-rare earth concentrate | (f) |
| 20 | — | 10 | 1-sucrose, $C_{12}H_{22}O_{11}$ | (g) |
| — | 20 | 10 | 1-sucrose, $C_{12}H_{22}O_{11}$ | (h) |
| 20 | — | 10 | 1-Sorbitol,$(CH_2OH(CHOH)_2)_2$ | (i) |
| — | 20 | 10 | 1-Urea, $H_2NCONH_2$ | (j) |
| 20 | — | 10 | 1-anthracene, $C_6H_4(CH)_2C_6H_4$ | (k) |
| 10 | 10 | 10 | 1-paraffin $C_{25}H_{52}$ (average) (pellets) | (l) |
| 10 | 10 | 10 | 1-hydroxyethyl cellulose | (m) |
| 20 | — | 10 | 1-titanium hydride, $TiH_2$ | (n) |
| 20 | — | 10 | 1-beryllium hydroxide, $Be(OH)_2$ | (o) |
| — | 20 | 10 | 1-beryl, natural ore containing $3BeO.Al_2O_3.6SiO_2$ | (p) |

All dry mixtures formed workable mortars with water and set to form self supporting structures.

Notes (a) Additional hydrogen was introduced from both the amonium radical and the water of hydration. Boron gave good thermal neutron capture.

(b) Additional hydrogen was introduced from the (OH) group, and also from the fact that a hydrate $(Li(OH).H_2O)$ was formed during setting.

(c) Boric acid furnished additional hydrogen and also boron.

(d) Calcium sulfate converted in presence of added water to $CaSO_4.2H_2O$, and supplied additional hydrogen. Setting was slow but good structure was assisted by the formation of interlocking crystals.

(e) Gadolinium has a very high cross section for thermal neutrons capture (46,000 barns).

(f) Analysis of the rare earth concentration showed the following composition, calculated as weight percent oxide: $Sm_2O_3$-44.3%, $Gd_2O_3$-15.0%, $Nd_2O_3$-18.7%, $Pr_6O_{11}$-2.6%, $La_2O_3$-3.4%, $Ew_2O_3$-0.02%, $CeO_2$-2.5%, $Y_2O_3$-5.23%, $Tb_4O_7$-1.0%, $H_2O$-6.5%.

(g), (h), (i), (j) All of these added hydrogen as water soluble substances, that assisted in filling small voids, and upon crystallization contributed to a varying degree of bonding action.

(k), (l) Illustrates use of aromatic and aliphatic hydrocarbon to the discontinuous phase. In general, these hydrocarbons are inferior to polymerized hydrocarbons.

(m) A nonionic water-soluble polymer illustrates another type high molecular weight that can be used for increasing the hydrogen content.

(n) A convenient means of introducing more hydrogen in the form of a hydride.

(o) Both beryllium and hydrogen are added. Be is a good neutron moderator and reflector.

(p) Another illustration of the use of a low cost natural ore to add desirable radiation shielding characteristics.

10. A series of tests were made on mixtures which contained a fixed ratio of lead powder and high density polyethylene-350 parts by weight of lead to 60 parts by weight of the plastic. Sucrose was added to 410 parts of the said powdered lead-polyethylene mixture in varying proportions from 0 to 30 parts by weight. Forty parts of water were added respectively, to each mixture to form the mortar. All mortars set satisfactorily in the mold. Above about 15 parts sucrose, the setting time was significantly longer, increasing with increasing concentration of sucrose. Exposure to infra-red radiation decreased the setting time.

11. A plaster mortar was prepared by mixing the weight percent of the following ingredients: lead powder- 75%, polyethylene powder- 14%, sucrose- 5%, carbon black- 1/4% and water- 5 3/4%. The easily workable plaster was applied successfully on a concrete block wall, and the coating set in 24 hours. Hardness of the plaster coating improved with time. A small improvement in application was noted when a standard concrete bonding agent was initially applied to the wall.

Tests showed that this material could be plastered easily on surfaces of Portland cement, concrete or cinder block, brick, plaster board, and wall tile. Initial application of a coating of standard, commercially available bonding agent assisted the bonding qualities to varying degree.

Numerous tests also showed that this plaster could be applied to surfaces of other set shielding products described in this invention. These tests led to the conclusion that it is practical to produce a composite radiation shield by applying successive layers of plasters comprising the desired atoms in the desired sequence. This procedure has great advantage when the source radiation striking the face of a shield is of an entirely different character in both type and energy spectrum than that of the radiation encountered in various other parts of the shield, born within the shield as a result of various interactions, which often trigger simultaneous and sometimes successive secondary radiation effects.

It was found that a protective coating such as an epoxy or vinyl resin could be applied to the survaces of these shielding materials to improve surface hardness and appearance, and to seal its surface.

12. Experiments were made to study the effects of various mixtures of particle sizes of hydrogenous material added as the discontinuous phase on non-combustible structures. Results were shown by a series of tests made using combinations of different sizes of polyethylene ⅛ inch to 100 mesh, in the lead-water matrix continuous phase using 200 mesh lead powder. It was concluded from these studies that the best structure, with given lead power-polyethylene ratio, was obtained with the maximum difference in polyethylene particle size, and with the ratio of fine to coarse particles ranging from about one part fine to 2-4 parts of coarse. Similar results were obtained using Portland cement as the continuous phase matrix. Still larger pellets gave better strength of the set product in large mass, using constant ratios of lead to polyethylene. However, this general trend is invalid when particle size exceeds about 10 percent of the shield thickness. These factors are also limited by considerations of non-homogenity with respect to radiation shielding effectiveness.

A typical mixture of dry ingredients within the desired range of particle size and composition consists of the following volume ratios: lead powder (200 mesh) - 1 part, polyethylene pellets (⅛ inch diameter)-1.5 parts and polyethylene powder (100 mesh) - 0.5 part. However, the invention is operable over much wider limits.

Additional experiments showed that additives could also be used in larger sizes as aggregates in the shield to modify various compositions. Each additive became an additional discontinuous phase in the matrix. The particular aggregates used may be varied widely to meet specific requirements and include such examples as borated graphite, lead shot, iron filings, mine tailings, tungsten, and depleted uranium pellets. Materials with a density greater than about 7 $gcm^{-3}$ are particularly useful for the better attenuation of gamma rays in mixed radiations.

Fire Resistance Characteristics

A series of studies were made to determine the relative fire resistance character of the composition disclosed in this invention.

An analysis was first made relative to the important parameters involved in formulating a fire resistant shield containing a combustible material with a high concentration of hydrogen atoms. The most promising means seemed to lay conceptionally in dividing the combustible material into relatively small particles and placing them into separate compartments having non combustible walls. The fire barriers around each particle of combustible, hydrogenous material would isolate it from direct contact with a flame, and also would seal off the air supply which is necessary for combustion. The basic principle is an adaptation of the use made of fire walls in building construction and fire proof vaults, and may be expressed technically in this new application as dispersing the hydrogenous combustible material as a discontinuous phase in a non-combustible matrix in continuous phase. It must be noted that this improvement was never used nor disclosed by sophisticated shield designers who recognized the need for a solution to their fire-hazard problem.

Flame test studies directed toward a more complete understanding of the problems showed, as expected, that a stack of polyethylene sheets burned much more readily than did similar polyethylene sheets separated by thin layers of set Portland cement. A cast sample of a mixture of polyethylene beads and Portland cement in equal volume ratio, with the polyethylene in a discontinuous phase also was less combustible than was the sample containing alternate layers of Portland cement and polyethylene.

Reference was made previously (prior art) concerning the phase character of the Thiessen composition. Comparative studies were made using Example 1 described in the Thiessen patent and one using similar ratios of matrix to polymeric material, using the procedure outlined earlier. The Thiessen composition was given the additional 7 hour steam treatment as described. These two finished samples were then broken and examined microscopically for similarities and differences, especially with reference to phase characteristics.

The broken sample of this invention showed that each bead of expandable polystyrene was surrounded by a continuous phase of Portland cement matrix, and thus the beads were encased in distinctly, separate, fire resistant compartments. This discontinuous phase character of the beads was very clear along all of the broken faces of the sample. The system can be accurately described as one having one solid continuous phase of Portland cement matrix and one discontinuous solid phase of polystyrene beads dispersed therein.

The Thiessen product sample showed a distinctly different appearance along the broken faces. The polystyrene beads had lost their spherical shape and had flowed together irregularly throughout the mass into a continuous phase. This system can best be described as one having two discontinuous interlocking phases with no discontinuous phase. The system is analogous to that of a sponge, where the air (gas) phase portion of the sponge represents the polyetyrene phase, and the solid portion of the sponge represents a combination of all other ingredients in the Thiessen formulation.

This phase characterization of the Thiessen product coincides with the one expected from a careful reading of U.S. Pat. No. 3,021,291. First, Thiessen formulated a lightweight concrete block by beating his initial rich creamy slurry of ingredients to a frothy pulp. This mixture was poured into forms to set. At this stage of the process, the polystrene bead phase may have been present as a discontinuous phase in the continuous matrix phase, and the gase phase forming the froth may also have been in a discontinuous phase in the same matrix. However, the system was then placed in an autoclave under 15 to 20 pounds steam pressure for about 7 hours. As described: "The steam curing increases the compressive structure and also permits the polystyrene beads to expand into the voids within the concrete filling them completely and sealing them against the transmission of water and humidity". (Column 3, lines 60-65).

A mass transfer of polystyrene in a discontinuous phase into a second discontinuous phase of air bubbles in the same continuous phase, obviously necessitates the breaking of the continuous phase barrier separating them. The inevitable conclusion is that when all the voids (air) have been filled by the polystyrene phase, this phase has become substantially continuous. In this connection, it is important to note that Thiessen states that the polystyrene beads "expand into the voids within the concrete filling them completely". The increased compressive strength of the concrete structure as a result of the final steam curing step supports the observation that the polystyrene phase has been transformed from a discontinuous phase to a continuous phase, giving a more rigid interlocking supporting structure to augment that supplied by the continuous phase matrix.

The Thiessen product was compared further with the product of this invention relative to the effects of contact with an open flame, in an assimulation of practical conditions.

Discs made of the two materials, (namely, product of this invention and that developed by THIESSEN) 4 inches in diameter and 0.5 inches thick, were suspended horizontally over similar small open flames, the flame striking the bottom face at the center points of the specimens. Examinations were made at periodic intervals up to 4 hours.

Results from above observation may be summarized as follows:

1. The relative physical strengths of the product of this invention was superior for all comparable times, as was determined by hand breaking tests. While neither sample actually collapsed under its own weight, microscopic examination of the broken specimens following the flame test showed a superior integral structure for the product of this invention.

2. Temperatures at top of the respective discs were compared. It was observed that the surface temperature of the disc made of Thiessen's product was higher than the temperature at the corresponding point on the disc cast from material of this invention. This higher temperature probably indicates exothermic combustion of polymeric material in the Thiessen product. The burning odor also was more pronounced in the Thiessen product, indicating a faster decomposition of this product.

What is claimed is:

1. A method comprising attenuating nuclear radiation by intercepting the radiation with a non-combustible, self supporting system formed of a continuous phase of fire resistant cementitious material and in which is dispersed a discontinuous phase, said discontinuous phase containing hydrogen atoms in the form of a rigid, combustible organic plastic or resin with a particle size distribution such that no more than 10 percent of said discontinuous phase passes a 150 mesh screen and with a volume percent range of said continuous phase between about 40 percent and about 98 percent of the total shield volume.

2. The method as defined in claim 1 wherein the discontinuous phase is a hydrocarbon.

3. The method as defined in claim 2 wherein the hydrocarbon is selected from the group consisting of polyethylene, polypropylene, polybutylene and polystyrene and combinations thereof.

4. The method as defined in claim 1 wherein a metallic atom is dispersed in the organic compound prior to the mixing of the dry mortar ingredients.

5. The method as defined in claim 1 wherein the organic material is a plastic which is adapted to withstand radiation doses of less than approximately $1 \times 10^7$ rads.

6. The method as defined in claim 1 wherein the continuous phase of the fire resistant cementitious material is a matrix produced from metalic lead powder and water.

7. The method according to claim 1 in which the continuous phase of the fire resistant cementitious material is selected from the group consisting of Portland cement, wall plaster, Plaster of Paris, silica gel, clay or combinations thereof, set with water.

8. The method according to claim 1 comprising dispersing a further material in the continuous phase and including a neutron attenuating substance.

9. The method as defined in claim 8 in which said further material is selected from substances containing atoms with atomic numbers below 10.

10. The method as defined in claim 9 in which said attenuation substance is carbon, boron, lithium, hydrogen or combinations thereof.

11. The method as defined in claim 1 comprising dispersing a further material in the continuous phase, said further material including hydrogenous compounds selected from the group consisting of an organic substance, a hydroxide, a hydrate and combinations thereof.

12. The method as defined in claim 1 comprising dispersing a further material in the continuous phase, the further material including a metal hydride which is stable in the presence of water.

13. The method as defined in claim 12 comprising a further material dispersed in the continuous phase and including metallic atoms selected from the group consisting of titanium, gadolinium, samarium, europium, dysprosium, plutonium and combinations thereof.

14. The method as defined in claim 1 comprising dispersing a further material in the continuous phase, said further material including a substance containing a heavy metallic atom that in the free elemental state has a density greater than approximately 7.0 g $cm^{-3}$ at 20° C.

15. The method as defined in claim 1 comprising dispersing a further material in the continuous phase, said further material including a natural metallic ore aggregate.

16. The method as defined in claim 1 comprising dispersing a further material in the continuous phase, said further material being in the form of aggregates with a multiplicity of screen sizes.

17. The method as defined in claim 16 in which the distribution of particle size of aggregates is selected to produce an aggregate mixture with less than 40 percent void volume.

18. The method as defined in claim 17 in which the setting agent is water and comprising a further material dispersed in the continuous phase and including sucrose.

19. The method as defined in clam 1 in which the weight percent hydrogen in the set material is greater than 2.9.

20. The method as defined in claim 1 wherein said discontinuous phase contains hydrogen atoms in the form of titanium hydride.

21. A self-supporting, non-combustible, nuclear radiation shielding composition comprising a continuous phase of fire resistant cementitious material and a discontinuous phase dispersed therein, said discontinuous phase containing hydrogen atoms in the form of a rigid, combustible, organic plastic or resin with a particle size distribution such that no more than 10 percent of said discontinuous phase passes a 150 mesh screen and with a volume percent range of said continuous phase between about 40 percent and about 98 percent of the total shield volume, said continuous phase being adapted to retain its shape in the presence of a temperature adapted to soften, melt or decompose the discontinuous phase, said composition further comprising a further material dispersed in the continuous phase and including a substance containing at least one enriched isotope of an element in a ratio different from that present in natural abundance.

22. The composition of claim 21 wherein said enriched isotope is selected from the group consisting of lithium 6, boron 10, cadmium 113, samariun 149 and gadolinium 157.

* * * * *